United States Patent [19]

Viegas et al.

[11] Patent Number: 5,315,840
[45] Date of Patent: May 31, 1994

[54] AIR CONDITIONING AND REFRIGERATION METHODS AND APPARATUS UTILIZING A CRYOGEN

[75] Inventors: Herman H. Viegas, Bloomington, Minn.; Roland L. Roehrich, Pittsburgh, Pa.

[73] Assignee: Thermo King Corporation, Minneapolis, Minn.

[21] Appl. No.: 982,329

[22] Filed: Nov. 27, 1992

[51] Int. Cl.⁵ ............................................. F25D 25/00
[52] U.S. Cl. ............................................. 62/167; 62/7; 62/50.2; 62/239
[58] Field of Search ............ 62/7, 50.2, 167, 239

[56] References Cited

U.S. PATENT DOCUMENTS

| | | |
|---|---|---|
| 3,788,091 | 1/1974 | Miller ................................. 62/332 |
| 3,802,212 | 4/1974 | Marin et al. . |
| 4,045,972 | 9/1977 | Tyree, Jr. . |
| 4,100,759 | 7/1978 | Tyree, Jr. . |
| 4,186,562 | 2/1980 | Tyree, Jr. . |
| 4,406,129 | 9/1983 | Mills ................................. 62/7 |
| 4,498,306 | 2/1985 | Tyree, Jr. . |
| 5,040,374 | 8/1991 | Micheau . |
| 5,069,039 | 12/1991 | Martin . |

*Primary Examiner*—Ronald C. Capossela
*Attorney, Agent, or Firm*—M. J. Moran

[57] ABSTRACT

Methods and apparatus for controlling the air temperature of a conditioned space to a selected set point temperature, utilizing a supply of cryogen in liquid and vapor states. The two states are drawn from the supply and maintained in first and second separate, independent flow paths. The liquid cryogen provides a cooling mode for the conditioned space via a heat exchanger disposed in the first flow path, and the vaporized cryogen provides a cooling mode for the conditioned space via a heat exchanger disposed in the second flow path. Cryogen flowing in at least one of the flow paths is used to drive a vapor motor connected to a fan, with the fan moving air between the conditioned space and at least one of the heat exchangers. Heat is applied to the cryogen as required to hold the set point temperature, or to defrost a heat exchanger.

60 Claims, 3 Drawing Sheets

5,315,840

AIR CONDITIONING AND REFRIGERATION METHODS AND APPARATUS UTILIZING A CRYOGEN

TECHNICAL FIELD

The invention relates in general to air conditioning and refrigeration systems, and more specifically to the use of a cryogen for controlling the temperature of a conditioned space of stationary and transport type air conditioning and refrigeration systems.

BACKGROUND ART

Refrigeration systems, including those used on straight trucks, truck-trailer combinations, and refrigerated containers, buses, and the like, conventionally utilize a chlorofluorocarbon (CFC) refrigerant in a mechanical refrigeration cycle. The mechanical refrigeration cycle requires a refrigerant compressor driven by a prime mover, which often includes an internal combustion engine, such as a diesel engine. Because of the suspected depleting effect of CFC's on stratospheric ozone ($O_3$), and detrimental effects of diesel emissions, practical alternatives to the use of CFC's in air conditioning and refrigeration systems are being sought.

The use of a cryogen, i.e., a gas which has been compressed to a very cold liquid state, such as carbon dioxide ($CO_2$) and nitrogen ($N_2$), in air conditioning and refrigeration systems is particularly attractive because, in addition to eliminating the need for a CFC, it also eliminates the need for a compressor and associated prime mover.

Thus, it would be desirable, and it is an object of the present invention, to provide reliable, efficient, practical methods and apparatus which utilize a cryogen in air conditioning and refrigeration systems.

SUMMARY OF THE INVENTION

The invention includes methods and apparatus for controlling the temperature of air in a conditioned space to a predetermined temperature range adjacent to a selected set point temperature, using a cryogen, such as liquid $CO_2$ or liquid $N_2$. For purposes of example, the specification will hereinafter refer to the cryogen as being $CO_2$, as $CO_2$ is especially suitable for use in certain embodiments of the invention, but it is to be understood that other cryogens may be used.

The methods include the step of providing a supply of cryogen, with the cryogen being in liquid and vapor states. A cooling mode includes the steps of cooling the air of a conditioned space by providing first and second separate, independent flow paths for the liquid and vapor states of the cryogen, with first and second heat exchanger means being respectively disposed in the first and second flow paths.

The apparatus includes a refrigeration system for controlling the air temperature of a conditioned space to a selected set point temperature via at least a cooling mode. The apparatus includes a supply of cryogen which includes cryogen in liquid and vapor states, first and second heat exchanger means, first and second separate, independent cryogen flow paths, means directing liquid cryogen from the supply through the first heat exchanger means via the first flow path, vaporizing the liquid cryogen, and means directing vaporized cryogen from the supply through the second heat exchanger means via the second flow path. The apparatus additionally includes vapor driven motor means, fan means driven by the vapor driven motor means which moves air from the conditioned space in heat exchange relation with at least one of the first and second heat exchanger means, and means directing the vaporized cryogen from a selected one of the first and second flow paths through the vapor driven motor means to drive the motor and fan means.

In a preferred embodiment of the invention, which embodiment is especially suitable when the cryogen is $CO_2$, the source of $CO_2$ in both liquid and vapor states is provided by an independent or separate source of liquid $CO_2$ which is at substantially the same temperature and pressure "as supplied" by ground support apparatus. This arrangement, which thus includes two vessels, simplifies the filling process, and eliminates the venting of $CO_2$ vapor often involved in cryogenic refrigeration systems which use a tank filled with liquid $CO_2$ at a lower pressure and lower temperature than provided by ground support apparatus.

Different embodiments of the methods and apparatus include heating and defrost modes which selectively add heat to the cryogen in the first and second separate, independent flow paths, and independent fan control modes in which vapor motors disposed in the first and/or second flow paths may be operated at any desired horsepower, notwithstanding that the conditioned space is in a cooling mode, heating mode, or a null mode.

DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

As used in the following description and claims, the term "conditioned space" includes any space to be temperature and/or humidity controlled, including stationary and transport applications for the preservation of foods and other perishables, maintenance of a proper atmosphere for the shipment of industrial products, space conditioning for human comfort, and the like. The term "refrigeration system" is used to generically cover both air conditioning systems for human comfort, and refrigeration systems for preservation of perishables and shipment of industrial products. Also, when it is stated that the temperature of a conditioned space is controlled to a selected set point temperature, it is to be understood that the temperature of the conditioned space is controlled to a predetermined temperature range adjacent to the selected set point temperature. In the figures, valves which are normally open (n.o.), are illustrated with an empty circle, and valves which are normally closed (n.c.) are illustrated with an "X" within a circle. Of course, the associated electrical or electronic control, hereinafter called "electrical control", may be changed to reverse the de-energized states shown. An arrow pointed at a valve in the figures indicates that the valve is, or may be, controlled by the electrical control.

Figure 1:
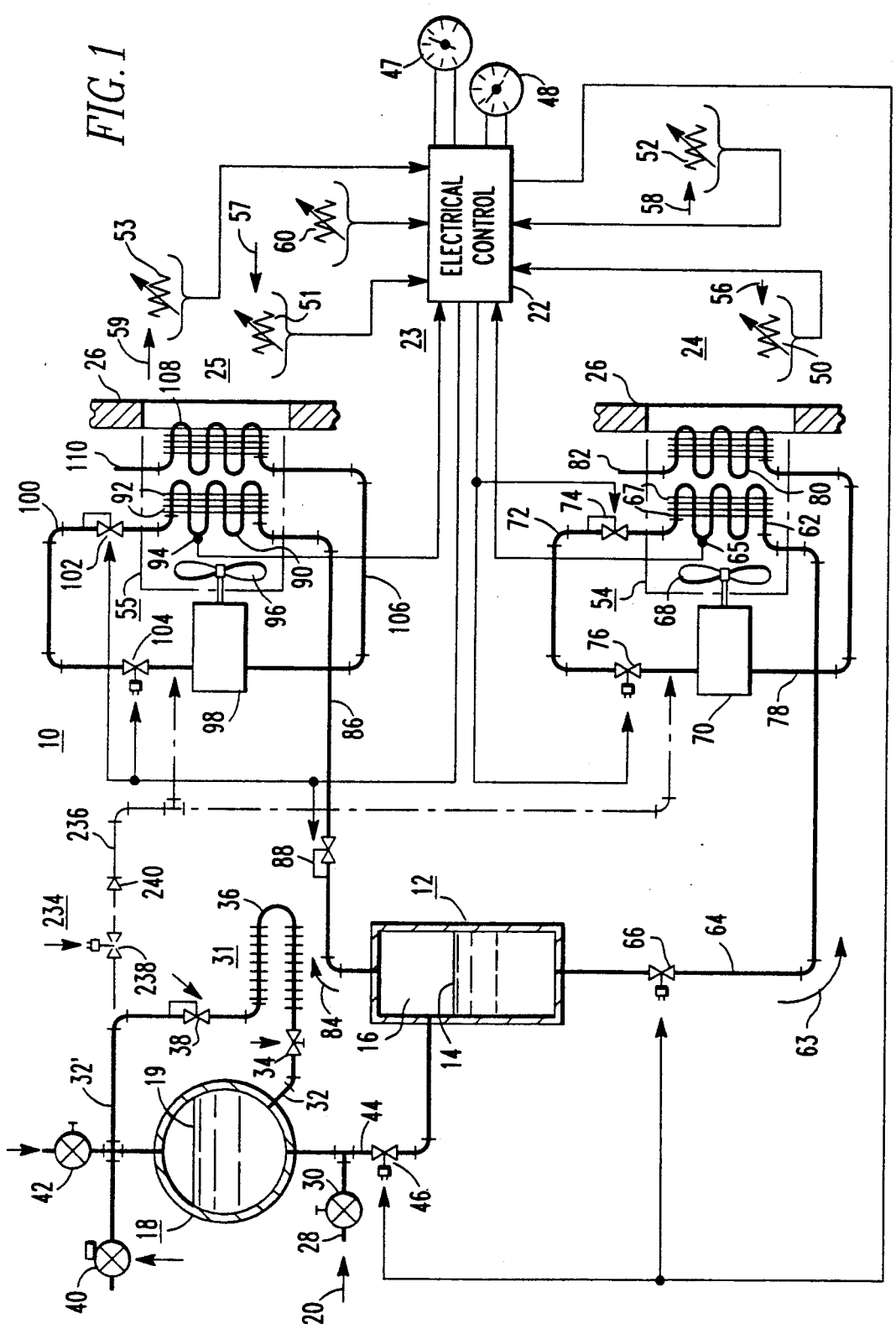
FIG. 1 is a diagrammatic representation of a refrigeration system constructed according to the teachings of the invention, illustrating a cooling mode which independently utilizes both liquid and vapor states of a cryogen to provide cooling for one or more conditioned spaces.
Figure 2:
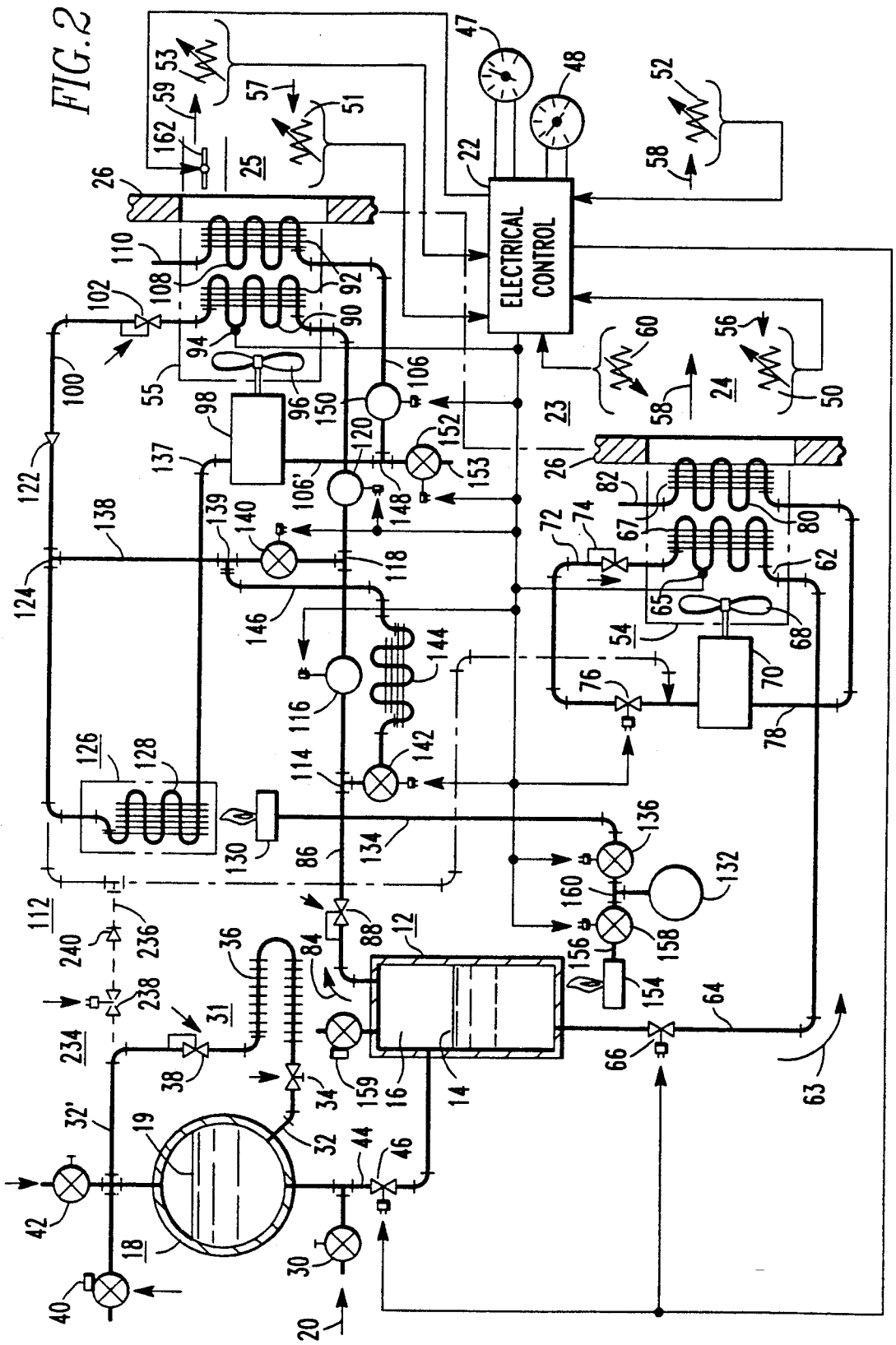
FIG. 2 is a diagrammatic representation of a refrigeration system constructed according to the teachings of the invention, illustrating both cooling and heating modes which independently utilize both liquid and vapor states of a cryogen to provide cooling and heating, as required, for one or more conditioned spaces.
Figure 3:
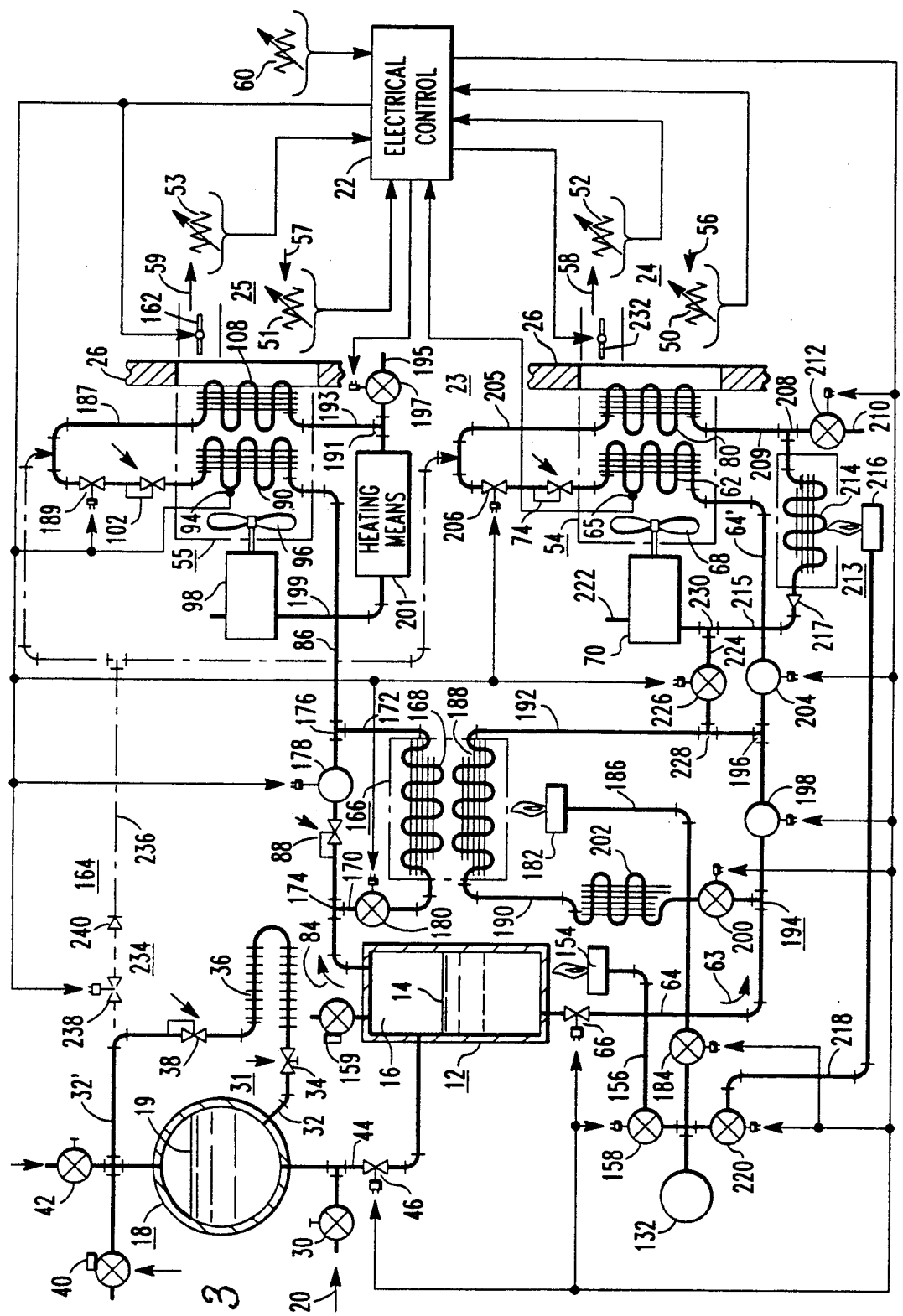
FIG. 3 is a diagrammatic representation of a refrigeration system illustrating additional heating and cooling mode embodiments of the invention which independently utilize both the liquid and vapor states of a cryogen to provide cooling, heating, and defrost functions.

Referring now to the drawings, and to FIG. 1 in particular, there is shown a refrigeration system 10 suitable for use with any conditioned space, and particularly well suited for use on straight trucks, tractor-trailer combinations, containers, and the like, with the word "vehicle" being used to generically refer to the various transport vehicles which utilize refrigeration systems. FIG. 1 illustrates new and improved cooling mode embodiments of the invention utilizing a cryogen. FIGS. 2 and 3 add new and improved heating and cooling mode embodiments of the invention to the arrangement of FIG. 1, with the heating modes being used for defrosting purposes, as well as for maintaining a predetermined set point temperature, or temperatures, in one or more conditioned spaces.

As hereinbefore stated, certain aspects of the present invention are particularly useful when liquid $CO_2$ is selected for the cryogen, and for purposes of example the following description of the new and improved methods and apparatus of the invention will be described as utilizing liquid $CO_2$.

The inventive methods and apparatus of the invention utilize a vessel 12 which contains $CO_2$ in both liquid and vapor forms, indicated at 14 and 16, respectively. As will be hereinafter explained, both forms of $CO_2$ are actively utilized, separately and independently from one another, to extract heat from, and to add heat to, the air from one or more conditioned spaces.

The invention applies broadly to the use of a single vessel 12 containing a cryogen, with liquid and vapor states thereof being actively used in heat exchange functions. In an embodiment of the invention which is particularly suitable when liquid $CO_2$ is used for the cryogen, another vessel 18 may be provided. Vessels 12 and 18 may be physically adjacent one another and insulated as a single assembly, if desired. Also, a single vessel may be partitioned to form two vessels 12 and 18. The second vessel 18 is initially substantially completely filled with liquid $CO_2$ 19 from ground support apparatus or trucks, shown generally at 20. No deliberate attempt is made to change the "as delivered" pressure and temperature of the liquid $CO_2$ while filling vessel 18. For example, if liquid $CO_2$ is provided by ground support apparatus 20 at a pressure of 300 psia and temperature of 0° F. ($-17.8$° C.), then vessel 18 will be filled with liquid $CO_2$ at that pressure and temperature.

Prior art cryogenic based refrigeration systems which utilize one cryogenic supply vessel conventionally load the vessel with lower pressure $CO_2$, such as 100 psia, which reduces the temperature to $-58$° F. ($-50$° C.). As shown on a temperature-entropy diagram for $CO_2$, reducing the pressure from the "as supplied" pressure of 300 psia, for example, to 100 psia, causes about 20% of the $CO_2$, by weight, to vaporize. This complicates the filling procedure, and the vaporized $CO_2$ is either wasted by venting it to the atmosphere, or a vapor recovery system must be used. The lower temperature of the prior art single supply tank, i.e., $-58$° F. ($-50$° C.), as opposed to 0° F. ($-17.8$° C.) in the initial supply vessel when using the two vessel arrangement of the invention, also results in a higher heat gain to the supply tank because of the much greater temperature difference between the temperature of the cryogen and the ambient temperature, ($\Delta T$), which reduces the length of time a given supply vessel will maintain useful cryogen.

Utilizing two tanks 12 and 18 provides the freedom for electrical control apparatus 22 to select an optimum operating pressure of the cryogen at any instant as a function of system needs, i.e., the operating pressure is selected and varied, as required, based upon: (1) a selected set point temperature, or set point temperatures, when more than one conditioned space is being controlled; (2) the actual temperature, or temperatures, of a conditioned space, or conditioned spaces; and (3) the ambient temperature.

The invention is suitable for use when refrigeration system 10 is associated with a vehicle 26 having a single conditioned space 23 to be controlled to a selected set point temperature; and, the invention is also suitable for use when transport refrigeration system 10 is associated with a vehicle 26 in which the conditioned space 23 is compartmentalized, i.e., the conditioned space of the vehicle 26 is divided into at least first and second separate conditioned spaces 24 and 25 to be individually controlled to selected first and second set point temperatures. In a compartmentalized vehicle, for example, one conditioned space may be used to condition a frozen load, and the other a fresh load, as desired.

For purposes of example only, the embodiments of the invention set forth in the figures illustrate a compartmentalized vehicle 26 having the hereinbefore mentioned first and second conditioned spaces 24 and 25. However, it is to be understood that the heat exchangers associated with the two conditioned spaces 24 and 25 illustrated in the figures may be used to serve a single conditioned space 23 in transport and stationary applications, and also that the heat exchangers may be associated with more than two conditioned spaces.

More specifically, vessel 18 is filled with liquid $CO_2$, indicated at 19, by connecting ground support apparatus 20 to a supply line or conduit 28 which includes a valve 30. Vapor pressure of the $CO_2$ in vessel 18 is maintained above the triple point, i.e., slush point, by a known prior art pressure maintaining arrangement 31 in which conduits 32 and 32' respectively connect a lower point of vessel 18 with an upper point. When a cryogen other than $CO_2$ is used, arrangement 31 is set to maintain a predetermined minimum pressure related to optimizing the system, including flow characteristics. A valve 34, a vaporizing coil 36, and a valve 38 are serially connected between conduits 32 and 32'. Valve 34 opens when the pressure in vessel 18 falls to a predetermined value, with the predetermined value being above the triple point of 75.13 psia for $CO_2$, admitting liquid $CO_2$ into vaporizing coil 36. Vaporizing coil 36 is exposed to ambient temperature outside of vehicle 26. The pressure regulating valve 38 then maintains the vapor pressure in vessel 18 at a predetermined level selected to prevent the formation of slush in vessel 18. A pressure reading safety valve 40 is also provided in conduit 32 at a point where vessel pressure may be directly sensed. A venting valve 42 is also provided to facilitate the filling process.

Since vessel 18 is loaded from ground support apparatus 20 without a deliberate change of pressure, very little vapor will be vented, unlike prior art filling arrangements which reduce the pressure of the $CO_2$ during filling.

A conduit 44 extends from a low point of vessel 18 to an intermediate point of vessel 12. Conduit 44 includes a regulated expansion valve 46 which is controlled by electrical control 22 as a function of system conditions at any instant. The expansion provided by expansion valve 46 is isenthalpic. For example, valve 46 may be controlled as a function of the desired set point temperatures, the actual temperatures of conditioned spaces 24 and 25, and the ambient temperature. The set point temperatures for conditioned spaces 24 and 25 are selected by set point temperature selectors 47 and 48. The temperature of conditioned space 24 is sensed by either, or both, return air and discharge air temperature sensors 50 and 52. Temperature sensor 50 senses the temperature of air returning to an air conditioning means or apparatus 54, with the return air being indicated by arrow 56. Temperature sensor 52 senses the temperature of air being discharged by air conditioning means 54, with the discharge air being indicated by arrow 58. The temperature of ambient air is sensed by an ambient air temperature sensor 60.

In like manner, the temperature of conditioned space 25 is sensed by either, or both, return air and discharge air temperature sensors 51 and 53. Temperature sensor 51 senses the temperature of air returning to an air conditioning means or apparatus 55, with the return air being indicated by arrow 57. Temperature sensor 53 senses the temperature of air being discharged by air conditioning means 55, with the discharge air being indicated by arrow 59.

Reducing the pressure of liquid $CO_2$ 19 via expansion valve 46 produces a combination of liquid $CO_2$ 14 and vaporized $CO_2$ 16 shown in vessel 12. If the exemplary pressure in vessel 18 is 300 psia, and the exemplary pressure in vessel 12 is 100 psia, the temperature of the saturated liquid and vapor states 14 and 16 will be about $-58°$ F. ($-50°$ C.). In the present invention, both the liquid and vapor states of the $CO_2$ are actively utilized in separate cryogen fluid flow paths which are maintained separate and independent throughout the use of the two states to perform cooling and heating functions in separate heat exchanger means.

The separate, independent usage of the liquid phase 14 will first be described. Liquid $CO_2$ 14 is admitted into a first heat exchanger 62 via a first active cryogen control valve 66. Heat exchanger 62, which is a part of air conditioning means 54, is disposed in heat exchange relation with return air 56 being drawn from conditioned space 24. Heat in return air 56 is absorbed into the liquid $CO_2$, with heat exchanger 62 being designed to completely vaporize the liquid $CO_2$. Thus, heat exchanger 62 may also be called an "evaporator coil", since its function is to evaporate all of the liquid $CO_2$ allowed to flow into it by flow control valve 66. As is known in the art, heat exchanger 62 may include a plurality of fins 67 for aiding heat transfer.

A temperature sensor 65 is disposed to sense the surface temperature of heat exchanger 62 to detect when evaporation may not be 100%, such as when surface ice builds up on heat exchanger 62. Thus, temperature sensor 65 may be used to enable electrical control 22 to trigger a defrost mode or cycle, as will be hereinafter explained. Other means may be used to trigger defrost, such as a timer, a manual switch, a programmed algorithm, and the like.

Air in conditioned space 24 is drawn into air conditioning means 54, and discharged back into conditioned space 24, by a fan or blower 68 which is driven by vaporized $CO_2$ in a suitable vapor motor or turbine 70, which will hereinafter be referred to as vapor driven motor 70.

Vaporized $CO_2$ from the exit end of heat exchanger 62 is directed to the input of vapor motor 70 via a conduit 72 and a pressure regulating valve 74. In certain applications, and expansion valve 76 may also be provided. Expansion valve 76, when provided, isenthalpically expands the vaporized $CO_2$, and it may have a manually adjustable orifice, or the orifice size may be controlled by electrical control 22, as illustrated. The vaporized $CO_2$ is isentropically expanded in vapor motor 70, driving motor 70 and the fan or blower 68 connected thereto. The vaporized, isentropically expanded $CO_2$ is directed from the output of vapor motor 70 via a conduit 78 to a second heat exchanger 80 disposed in air conditioning means 54. The second heat exchanger 80 may have a surface temperature sensor (not shown), if desired to indicate when defrosting is necessary. Vaporized $CO_2$ may be discharged from an exit end 82 of the second heat exchanger 80, to the atmosphere, outside vehicle 26, after absorbing additional heat from the return air 56. In a stationary application, the $CO_2$ may be collected and compressed into a cryogenic state for reuse. As disclosed in concurrently filed application Ser. No. 07/982,333, now U.S. Pat. No. 5,267,446, when the temperature of the vaporized cryogen exiting heat exchanger 80 exceeds the ambient temperature, the exiting cryogen may also be directed to any ambient temperature coils or loops to add heat to such coils.

The conditioned air 58, which results from the heat exchange relation between the return air 56 and heat exchangers 62 and 80, is discharged back into conditioned space 24. Conditioned air does not mix with $CO_2$ at any point in the refrigeration systems of the invention. Thus, there is never any contamination of conditioned space 24 with $CO_2$. Of course refrigeration system 10 may be used in combination with arrangements which do inject $CO_2$ into a conditioned space for fast temperature pull down and/or for load preservation. In such combined applications either vessel 12 or 18 may be used as the source of the $CO_2$.

When vehicle 26 is divided into first and second conditioned spaces 24 and 25, as in the exemplary embodiment, via suitable divider means, and conditioned space 24 is being controlled to a lower temperature than is being maintained in conditioned space 25, the exit end 82 of the second heat exchanger 80 may be connected to a third heat exchanger associated with conditioned space 25, via an appropriate conduit, pressure regulating valve, and expansion valve (not shown). The pressure regulating valve would maintain a predetermined pressure in the second heat exchanger 80, and the expansion valve would drop the pressure and temperature of the vaporized $CO_2$ which enters the third heat exchanger.

The separate, independent usage of the vapor phase 16 of the $CO_2$ will now be described. A second active, independent cryogen fluid flow path 84, which includes a conduit 86 and a pressure regulating valve 88, withdraws vaporized $CO_2$ 16 from vessel 12 under the regulation of valve 88 which maintains a vapor pressure in vessel 12 above the triple point. Vaporized $CO_2$ 14 is admitted into a first heat exchanger 90 via the second active cryogen flow path 84. Heat exchanger 90, which is disposed in air conditioning function 55, is disposed in heat exchange relation with return air 57 being drawn from conditioned space 25. Heat in return air 57 is absorbed into the vaporized $CO_2$. As is known in the art, heat exchanger 90 may include a plurality of fins 92 for aiding heat transfer.

A temperature sensor 94 is disposed to sense the surface temperature of heat exchanger 90 at a location at or near the exit end of heat exchanger 90, for purposes similar to those hereinbefore described relative to coil temperature sensor 65 associated with heat exchanger 62. There is no evaporation taking place in heat exchanger 90, but the need for defrost can be detected.

Air in conditioned space 25 is drawn into air conditioning means 55, and discharged back into conditioned space 25, by a fan or blower 96 which is driven by vaporized $CO_2$ in a suitable vapor motor or turbine 98, which will hereinafter be referred to a vapor driven motor 98. When conditioned spaces 24 and 25 are arranged side-by-side in vehicle 26, i.e., the total vehicle space to be conditioned is divided by a divider which extends from the front to the back of the vehicle, instead of from one side to the other, one of the vapor driven motors 70 or 98 may be eliminated, with the fan 68 or 96 associated with the eliminated vapor motor being driven by a belt and pulley arrangement from the remaining vapor motor. This arrangement is suitable when independent air control is not required for the two conditioned spaces.

Vaporized $CO_2$ from the exit end of heat exchanger 90 is directed to the input of vapor motor 98 via a conduit 100 and a pressure regulating valve 102. An expansion valve 104 may also be provided in certain applications. Expansion valve 104, when used, isenthalpically expands the vaporized $CO_2$, and it may have a manually adjustable orifice, or the orifice size may be controlled by electrical control 22, as illustrated. The vaporized $CO_2$ is isentropically expanded in vapor motor 98, driving motor 98 and the fan or blower 96 connected thereto. The vaporized, isentropically expanded $CO_2$ is directed from the output of vapor motor 98 via a conduit 106 to a second heat exchanger 108 disposed in air conditioning means 55. The second heat exchanger 108 may have a surface temperature sensor (not shown), if desired, to be able to control the degree of superheat in the vapor, and/or to determine when defrosting is necessary. Vaporized $CO_2$ may be discharged from an exit end 110 of the second heat exchanger 108, to the atmosphere, outside vehicle 26, after absorbing additional heat from the return air 57, or expended cryogen may be utilized as described relative to cryogen exiting discharge point 82.

The conditioned air 59, which results from the heat exchange relation between the return air 57 and heat exchangers 90 and 108, is discharged back into conditioned space 25. As hereinbefore stated, conditioned air does not mix with $CO_2$ at any point in the refrigeration systems of the invention. Thus, there is never any contamination of conditioned space 25 with $CO_2$. However, as hereinbefore stated, refrigeration system 10 may be used in combination with arrangements which inject $CO_2$ into a conditioned space for fast temperature pull down and/or for load preservation. In such combined applications either vessel 12 or 18 may be used as the source of the $CO_2$.

When the total space to be conditioned is divided into first and second conditioned spaces 24 and 25, as in the exemplary embodiment, via suitable divider means, and conditioned space 25 is being controlled to a lower temperature than is being maintained in conditioned space 24, the exit end 110 of the second heat exchanger 108 may be connected to a third heat exchanger associated with conditioned space 24, via an appropriate conduit, pressure regulating valve, and expansion valve (not shown). The pressure regulating valve would maintain a predetermined pressure in the second heat exchanger 108, and the expansion valve would drop the pressure and temperature of the vaporized $CO_2$ which enters the third heat exchanger.

FIG. 2 sets forth a diagrammatic representation of a refrigeration system 112 which is similar to the transport refrigeration system 10 shown in FIG. 1, except FIG. 2 adds means for heating conditioned space 25 when required to hold the selected set point temperature, as well as means for defrosting water ice on the heat exchangers of air conditioning function 55. Components in FIG. 2 which may be the same as in FIG. 1 are identified with the same reference numbers and will not be described again in detail.

In general, the embodiment of FIG. 2 provides heating functions via the options of adding heat to the vaporized $CO_2$ 16 after it leaves supply vessel 12 in the second flow path 84. FIG. 2 also illustrates applying heat directly to vessel 12 to generate additional vaporized $CO_2$ for use in the second flow path 84. As disclosed in concurrently filed application Ser. No. 07/982,364, FIG. 2 illustrates providing independent control over fan or blower 98, enabling fan or blower 98 to circulate air throughout conditioned space 25 during cooling and heating cycles, and also without cooling or heating the air of conditioned space 25, e.g., during a null cycle initiated when refrigeration system 112 does not require heating or cooling to maintain the selected set point temperature in conditioned space 25. FIG. 2 also illustrates an embodiment of the invention wherein the first heat exchanger 90 provides a cooling mode or cycle, and may provide heating/defrost cycles under certain flow path arrangements. The second heat exchanger 108 may also provide cooling, heating and defrost modes or cycles.

More specifically, conduit 86 is modified to include a tee 114, a valve 116, a tee 118, and a valve 120. Conduit 100 is modified to include a check valve 122, a tee 124, and a heating means or apparatus 126. Heating mans 126 includes a heat exchanger coil 128, and a burner 130 connected to a fuel source 132 via a conduit 134 and a valve 136. Fuel source 132, for example, may include a tank containing an inflammable gas, such as propane, or an inflammable liquid, such as diesel fuel. In stationary applications, heat may be provided by other available sources, such as electric, hot liquids, steam, waste gases, and the like. Heat exchanger coil 128 is connected to the input of vapor motor via a conduit 137.

Additional modifications include a conduit 138, a tee 139, and a valve 140 which are disposed to interconnect conduits 86 and 100 via the hereinbefore mentioned tees 118 and 124. A valve 142, an ambient temperature loop or coil 144, and a conduit 146 are disposed to interconnect conduits 86 and 138 via the hereinbefore mentioned tees 114 and 139. A tee 148 and valve 150 are disposed in conduit 106 between the output of vapor motor 98 and the second heat exchanger 108, with the remaining opening in tee 148 being connected to a dump valve 152. Conduit 106 is referenced 106' between vapor motor 98 and tee 148. Dump valve 152 may be connected to an open ended exhaust conduit 153 in a transport application. In a stationary application, the vapor may be collected and compressed to a cryogenic state for reuse. Finally, provision is made for optionally adding heat directly to the intermediate vessel 12 via a burner 154 which is connected to the hereinbefore mentioned fuel source 132 via a conduit 156 and a valve 158 to generate additional vapor for use in flow path 84. The two valves 136 and 158 in the heating flow path are connected to fuel source 132 via a tee 160. A pressure relief valve 159 is added to vessel 12 in embodiments in which heat is applied directly to vessel 12.

During a cooling cycle, valves 116, 120 and 152 are open, with the flow path from vessel 12 including pressure regulating valve 88, conduit 86, valves 116 and 120, the first heat exchanger 90, conduit 100, heat exchanger coil 128, vapor motor 98, valve 150, and the second heat exchanger 108 If insufficient fan horsepower is developed by expanding the vapor isentropically in vapor motor 98, control 22 may open valve 136 which results in burner 130 igniting to add heat to the vaporized cryogen. The heated vapor may then be shunted away from heat exchanger 108 by closing valve 150 and opening dump valve 152. Thus, the vaporized cryogen may be superheated to the temperature necessary to develop the required fan horsepower, without adversely affecting a cooling cycle.

If additional vapor is required, control 22 may open 158 and ignite burner 154. An alternate arrangement for providing additional vapor includes tapping some liquid $CO_2$ from vessel 12, passing it through an ambient loop (not shown) to vaporize it, and introducing the resulting vapor into conduit 86 via a tee connector. This alternate arrangement may be used instead of heating vessel 12, if desired.

An oil mist may be added to conduit 137 between heat exchanger 128 and vapor motor 98, to provide lubrication to the bearings of vapor motor 98, and recovery of the oil may be performed by filtering means (not shown) disposed between vapor motor 98 and tee 148.

Defrosting water ice which forms on heat exchanger 90 may be accomplished by super heating vaporized cryogen in heat exchanger 128, closing dump valve 152, and opening valve 150. This directs the hot cryogen through the second heat exchanger 108 which is in close heat exchange relation with the first heat exchanger 90 via common fins 92. During defrost, control 22 may close an electrically or pneumatically controllable defrost damper 162, to prevent warm air from being circulated through conditioned space 25; or, alternatively fan 96 may be stopped during defrost, such as via an electric clutch disposed between vapor motor 98 and fan 96. If additional vapor is desired during defrost, control 22 may open valve 158 and ignite burner 154.

A heating cycle to hold the set point temperature would be performed in the same manner as the defrost cycle just described, except defrost damper 162 would not be closed.

If air circulation is desired when conditioned space 25 is in a null condition, requiring neither cooling nor heating to hold the desired set point temperature, a first option involves the closing of valve 120 and the opening of valve 140. This causes the first heat exchanger 90 to be by-passed, directing vaporized cryogen through by-pass conduit 138 directly to heat exchanger 128, which may add heat to the cryogen before it is used to drive vapor motor 98. The exhaust from vapor motor 98 may be vented via dump valve 152. A second option involves closing valves 116 and 120 and opening valve 142. This option directs the vaporized cryogen through the ambient loop 144 to pick up heat. If this does not provide sufficient fan horsepower by itself, additional fan horsepower may be provided by igniting burner 130.

FIG. 3 illustrates a diagrammatic representation of a refrigeration system 164 which is similar to the transport refrigeration system shown in FIG. 1, except FIG. 3 adds means for selectively heating both conditioned spaces 24 and 25 when required to hold the selected set point temperatures, as well as means for heating heat exchangers 62 and 80 in air conditioning means 54, and heat exchangers 90 and 108 in air conditioning means 55, for defrosting water ice which may form thereon. Components in FIG. 3 which may be the same as in FIGS. 1 and 2 are identified with the same reference numbers and will not be described again in detail.

In general, the embodiment of FIG. 3 provides heating functions via the options of adding heat to the liquid $CO_2$ 14 from supply vessel 12 in the first flow path 63; and/or heat to the vaporized $CO_2$ 16 from supply vessel 12 in the second flow path 84. Heat may also be applied to vessel 12 to generate additional vaporized $CO_2$ for use in the second flow path 84. In addition, FIG. 3 sets forth an aspect of the invention in which independent control over fans or blowers 68 and 96 is provided, enabling fan or blowers 68 and 96 to circulate air throughout conditioned spaces 24 and 25 without cooling or heating the air of the conditioned spaces, e.g., during a null cycle initiated when refrigeration system 158 does not require heating or cooling to maintain the selected set point temperatures in conditioned spaces 24 and 25.

Heat may be added to superheat the vaporized cryogen just before it enters vapor motors 70 and 98. Since vapor motors 70 and 98 are located downstream in the flow paths of all heating and cooling apparatus, any desired fan horsepower may be obtained during a cooling cycle, a heating cycle, or during a null period. On the other hand, if the temperatures of the vapors exiting vapor motors 70 and 98 are still suitable for adding heat to, or removing heat from, one or both conditioned spaces 24 and 25, the vapors may be directed via suitable conduits and valves to one or more additional heat exchanger coils.

In the independent fan control of the FIG. 2 embodiment, vaporized $CO_2$ 16 is used to generate the fan horsepower for vapor motor 98, while in the embodiment of FIG. 3, liquid $CO_2$ 14 and vaporized $CO_2$ are both used to generate fan horsepower for vapor motors 70 and 98, illustrating that independent fan control may be applied to either, or both, the independent cryogen flow paths 63 and 84.

More specifically, changes to the FIG. 1 embodiment required to add heat to vaporized $CO_2$ 16 in the second flow path 84 include providing heat exchanger means 166 which includes a heat exchanger coil 168. The ends of heat exchanger coil 168 are connected in spaced relation to conduit 86 via conduits 170 and 172 and associated upstream and downstream tees 174 and 176, respectively. A valve 178, along with pressure regulating valve 88, are disposed in conduit 86 between tees 174 and 176, and a valve 180 is disposed in conduit 170, between the upstream tee 174 and heat exchanger coil 168. Heat is applied to heat exchanger means 166, when required, by a burner 182, the fuel source 132, a valve 184 and a conduit 186.

Additional changes include connecting the output end of heat exchanger 90 to the input end of heat exchanger 108 via a conduit 187 which includes the hereinbefore mentioned back pressure regulating valve 102, and an optional expansion valve 189. The output end of heat exchanger 108 is connected to a tee 191 via a conduit 193. One branch of tee 191 is connected to an exhaust conduit 195 via a dump valve 197. The remaining branch of tee 191 is connected to vapor motor 98 via a conduit 199 and heating means 201. Heating means 201 may be similar to heating means 213, which will be hereinafter described in detail.

Changes to the FIG. 1 embodiment required to add heat to liquid $CO_2$ 14 from supply vessel 12 in the first flow path 63 include adding a heat exchanger coil 188 to heat exchanger means 166. The ends of heat exchanger coil 188 are connected in spaced relation to conduit 64 via conduits 190 and 192 and associated upstream and downstream tees 194 and 196, respectively. A valve 198 is disposed in conduit 64 between tees 194 and 196, and a valve 200 is disposed in conduit 192, between the upstream tee 194 and heat exchanger coil 188. An ambient temperature loop 202 may also be disposed in conduit 190. Heat is applied to heat exchanger means 166, when required, by the hereinbefore described burner 182, valve 184, conduit 186, and the fuel source 132.

Heat may be applied directly to vessel 12 via the hereinbefore described burner 154 which is connected to source 132 of inflammable gas or liquid via a conduit 156 and the valve 158. An alternative to heating vessel 12 to obtain additional vapor in flow path 84 includes tapping liquid $CO_2$ from vessel 12, passing it through an ambient loop to vaporize it, and connecting the resulting vapor to flow path 84, such as by a tee in conduit exiting the upper end of vessel 12.

Additional changes to the FIG. 1 embodiment which are included in the FIG. 3 embodiment include a valve 204 in conduit 64 between tee 196 and the first heat exchanger 62, and, additionally, the relative flow path positions of the heat exchangers 62 and 80 and vapor motor 70 are changed. The output end of the first heat exchanger 62 is directly connected to the input end of the second heat exchanger 80 via a conduit 205 which includes the hereinbefore mentioned pressure regulating valve 74, and an expansion valve 206. The output end of the second heat exchanger 80 is connected to a tee 208 via a conduit 209. One branch of tee 208 is connected to an exhaust conduit 210 via a dump valve 212. The remaining branch of tee 208 is connected to the input of vapor motor 70 via a conduit 215 which includes heating means 213. Heating means 213 includes a heat exchanger coil 214, a burner 216, and a check valve 217. Heat is added to heat exchanger coil 214 via the burner 216, with burner 216 being connected to fuel source 132 via a conduit 218 and a valve 220. The output of vapor motor 70 is connected to an exhaust conduit 222. A conduit 224 and a valve 226 interconnect conduits 192 and 215 via tees 228 and 230, respectively.

An electrically or pneumatically operated defrost damper 232 may be added to air conditioning means 54, to enable a discharge air path to be closed by control 22 while heat exchangers 62 and 90 are being defrosted.

When the first conditioned space 24 requires a cooling cycle, feed control valve 66 is controllably opened to admit liquid $CO_2$ into conduit 64. The liquid $CO_2$ passes through valves 198 ad 204 to the first heat exchanger coil 62, where heat is absorbed from the return air 56, vaporizing the liquid. Back pressure regulating valve 74 maintains the pressure in heat exchanger above the triple point, and expansion valve 206 provides an isenthalpic expansion, reducing the temperature of the vapor to remove still more heat from the return air 56 as the vapor passes through the second heat exchanger 80. The vapor is then isentropically expanded in vapor motor 70 to drive vapor motor 70 and fan 68. If additional fan horsepower is required, valve 220 may be opened, igniting burner 216 to superheat the vapor to the temperature necessary to achieve the increased fan horsepower.

When the first conditioned space 24 requires a heating cycle, valve 198 is closed and valves 200 and 184 are opened, with the opening of valve 184 being accompanied by the igniting of burner 182. Liquid $CO_2$ 14 from vessel 12 is directed through the ambient loop 202, vaporizing the $CO_2$ and then the vapors are superheated in heat exchanger 188. The superheated vapors are then directed through heat exchangers 62 and 80, and they warm the return air 56 from conditioned space 24. The heated vapor is then directed through the vapor motor 70, with burner 216 and heat exchanger 214 being available to add superheat if additional fan horsepower is required.

A defrost cycle for removing water frost and ice on heat exchangers 62 and 80 is similar to the heating cycle just described, except damper 232 is closed, to prevent heated air from being discharged into conditioned space 24. An alternative defrost arrangement, which does not require defrost damper 232, is to open dump valve 212, by-passing and thus stopping vapor motor 70 during defrost.

During a null cycle, when conditioned space 24 is satisfied, requiring neither cooling nor heating to hold the set point temperature, but air circulation in conditioned space 24 is desired, valves 198 and 204 are closed, and valves 184, 200 and 226 are opened. The liquid $CO_2$ is thus vaporized in ambient loop 202, superheated in heat exchanger 188, and then directed through vapor motor 70.

When conditioned space 25 requires a cooling cycle, the de-energized valve positions illustrated in FIG. 3 are utilized, with normally open valve 178 being open, and normally closed valve 180 being closed. Thus, cold $CO_2$ vapor circulates through the first heat exchanger 90 and removes heat from the return air 57. Back pressure regulating valve 102 maintains the pressure in heat exchanger 90 above the triple point of $CO_2$, and the optional expansion valve 189 provides an isenthalpic expansion of the $CO_2$ vapor. The $CO_2$ vapor is isentropically expanded in vapor motor 98, driving fan 96, and the $CO_2$ vapor is then directed through the second heat exchanger 108, to remove still more heat from the return air 57, before it is discharged back into conditioned space 25 as discharge air 59.

When conditioned space 25 requires a heating cycle to hold set point, valve 178 is closed and valves 180 and 184 are opened, igniting burner 182. The $CO_2$ vapor is then superheated to the desired temperature in heat exchanger 168, and directed through the flow path which includes heat exchangers 90 and 108 and vapor motor 98. A defrost cycle is similar, except defrost damper 162 is closed, or fan 96 is disconnected from vapor motor 70, such as with an electrically operated clutch.

The heating of vessel 12 by burner 154 in the embodiment of FIG. 3 is initiated when additional quantities of vapor are required for use by the second independent flow path 84 during cooling and/or heating cycles.

During the operation of refrigeration systems 10, 112 and 164 in a cooling cycle, it is necessary to maintain the pressure of the cryogen in the flow paths above a predetermined minimum value. Pressure regulators may be located at strategic locations in the flow paths; and/or the vapor pressure in vessel 18 may be used to maintain the pressure in the cryogen flow paths above the predetermined value, which for $CO_2$ is the triple point. A pressure maintaining arrangement 234 for using vapor pressure in vessel 18 for providing such pressure regulation is shown in phantom in the figures, including a conduit 236 which taps conduit 32', and a pressure regulator valve 238 which regulates the pressure in the flow paths to a predetermined pressure, or which is controlled by electrical control 22, as desired. A check valve 240 is illustrated, but may be unnecessary as the vapor pressure in vessel 18 should always be higher than the pressure at a flow path point. A valve (not shown) may also be added to conduit 236, which is controlled by control 22. Conduit 236 may have a smaller opening diameter than the main flow conduits. As indicated in the figures, the flow paths may be tapped and connected to the pressure maintaining arrangement 234 where necessary, such as indicated by the arrow heads.

While not illustrated in the figures, in order to prevent excessive pressures from building up when the refrigeration systems of the invention are shut down, a pressure relief valve should be added at any location where cryogen may be trapped between two valves at shut down.

Also, while not illustrated, it is to be understood that in transport applications blowers and/or fans driven by electrical motors powered by the vehicle electrical system, or other suitable source, may augment and/or replace the vapor motors, for moving air between the conditioned spaces and the associated heat exchangers. This is also applicable to stationary applications, with the electrical mains being used to power electrical motors connected to fans and/or blowers. Also, in transport applications, the vapor motors may drive electrical generators or alternators for the purpose of charging batteries associated with the refrigeration system control 22.

We claim:

1. A method for controlling the air temperature of a conditioned space to a predetermined set point temperature, comprising the steps of:
   providing a supply of cryogen which includes cryogen in liquid and vapor states,
   providing first and second separate, independent cryogen flow paths for the liquid and vapor states of the cryogen, respectively,
   providing a cooling mode,
   said cooling mode including the steps of cooling the air of the conditioned space via first and second heat exchanger means respectively disposed in said first and second flow paths,
   and moving air from the conditioned space in heat exchange relation with the first and second heat exchanger means to condition the air of the conditioned space.

2. The method of claim 1 including the step of using vapor pressure of the supply of cryogen to maintain vapor pressure at predetermined locations of the first and second cryogen flow paths above a predetermined value.

3. A method for controlling the air temperature of a conditioned space to a predetermined set point temperature, comprising the steps of:
   providing a supply of cryogen which includes cryogen in liquid and vapor states,
   providing first and second separate, independent cryogen flow paths for the liquid and vapor states of the cryogen, respectively,
   providing a cooling mode,
   said cooling mode including the steps of cooling the air of the conditioned space via first and second heat exchanger means respectively disposed in said first and second flow paths,
   dividing the conditioned space into at least first and second conditioned spaces,
   using the liquid cryogen from the supply to cool the first conditioned space via the first independent flow path and the first heat exchanger means,
   and using the vaporized cryogen from the supply to cool the second conditioned space, via the second independent flow path and second heat exchanger means.

4. The method of claim 3 wherein the cooling step additionally includes the steps of:
   moving air from the first conditioned space in heat exchange relation with the first heat exchanger means,
   moving air from the second conditioned space in heat exchange relation with the second heat exchanger means,
   and using vaporized cryogen to implement at least one of the air moving steps.

5. The method of claim 3 wherein the step of using the liquid cryogen to cool the first conditioned space via the first heat exchanger means vaporizes the liquid cryogen, and including the steps of directing the vaporized liquid cryogen through additional heat exchanger means, and moving air from the first conditioned space in heat exchange relation with the first and additional heat exchanger means.

6. The method of claim 5 including the steps of regulating the vapor pressure of vaporized liquid cryogen above a predetermined value, and expanding vaporized cryogen isenthalpically downstream from the first heat exchanger means.

7. The method of claim 5 including the step of using vaporized liquid cryogen in the first flow path to implement the air moving step, and wherein the step of directing vaporized liquid cryogen through the additional heat exchanger means precedes the step of using vaporized liquid cryogen to implement the air moving step.

8. The method of claim 3 including the steps of directing vaporized cryogen from the supply through additional heat exchanger means, and moving air from the second conditioned space in heat exchange relation with the second and additional heat exchanger means.

9. The method of claim 8 including the steps of regulating the vapor pressure of vaporized cryogen above a predetermined value, and expanding vaporized cryogen isenthalpically downstream from the second heat exchanger means.

10. The method of claim 3 including the steps of:
    providing a heating mode for both the first and second conditioned spaces, and switching between the cooling and heating modes, as required to hold the predetermined set point temperatures of the first and second conditioned spaces, said heating mode including the steps of adding heat to both the liquid and vaporized states of the cryogen from the supply, vaporizing the liquid cryogen, maintaining the heated cryogen from the vaporized and liquid states in the first and second separate, independent flow paths, and directing heated cryogen in heat exchange relation with the first and second heat exchanger means via the first and second independent flow paths.

11. A method for controlling the air temperature of a conditioned space to a predetermined set point temperature, comprising the steps of:

providing a supply of cryogen which includes cryogen in liquid and vapor states, providing first and second separate, independent cryogen flow paths for the liquid and vapor states of the cryogen, respectively, providing a cooling mode, said cooling mode including the steps of cooling the air of the conditioned space via first and second heat exchanger means respectively disposed in said first and second flow paths, moving air from the conditioned space in heat exchange relation with at least one of the first and second heat exchanger means, and using vaporized cryogen in at least one of the independent flow paths to implement the air moving step.

12. The method of claim 11 including the step of expanding vaporized cryogen isenthalpically during the air moving step implemented with vaporized cryogen.

13. A method for controlling the air temperature of a conditioned space to a predetermined set point temperature, comprising the steps of:

providing a supply of cryogen which includes cryogen in liquid and vapor states, providing first and second separate, independent cryogen flow paths for the liquid and vapor states of the cryogen, respectively, providing a cooling mode, said cooling mode including the steps of cooling the air of the conditioned space via first and second heat exchanger means respectively disposed in said first and second flow paths, and heating the supply to vaporize liquid cryogen and generate additional vaporized cryogen for the second flow path.

14. A method for controlling the air temperature of a conditioned space to a predetermined set point temperature, comprising the steps of:

providing a supply of cryogen, which includes cryogen in liquid and vapor states, including the steps of filling a first vessel with liquid cryogen, and expanding liquid cryogen from the first vessel into a second vessel, to provide the supply of cryogen in both liquid and vapor forms in the second vessel, providing first and second separate, independent cryogen flow paths for the liquid and vapor states of the cryogen, respectively, and providing a cooling mode, said cooling mode including the steps of cooling the air of the conditioned space via first and second heat exchanger means respectively disposed in said first and second flow paths.

15. The method of claim 14 wherein the step of filling the first vessel utilizes liquid cryogen supplied by ground support apparatus without deliberate change in pressure.

16. The method of claim 15 wherein the cryogen is $CO_2$.

17. The method of claim 14 wherein the cryogen is $CO_2$.

18. A method for controlling the air temperature of a conditioned space to a predetermined set point temperature, comprising the steps of:

providing a supply of cryogen which includes cryogen in liquid and vapor states, providing first and second separate, independent cryogen flow paths for the liquid and vapor states of the cryogen, respectively, providing a cooling mode, said cooling mode including the steps of cooling the air of the conditioned space via first and second heat exchanger means respectively disposed in said first and second flow paths, and providing a defrosting mode for defrosting the first heat exchanger means, said defrosting mode including the steps of adding heat to the liquid cryogen from the supply, to vaporize the liquid cryogen, and directing the heated, vaporized cryogen in heat exchange relation with the first heat exchanger means.

19. A method for controlling the air temperature of a conditioned space to a predetermined set point temperature, comprising the steps of:

providing a supply of cryogen which includes cryogen in liquid and vapor states, providing first and second separate, independent cryogen flow paths for the liquid and vapor states of the cryogen, respectively, providing a cooling mode, said cooling mode including the steps of cooling the air of the conditioned space via first and second heat exchanger means respectively disposed in said first and second flow paths, and providing a defrosting mode for defrosting the second heat exchanger means, said defrosting mode including the steps of adding heat to the vaporized cryogen from the supply, and directing the heated, vaporized cryogen in heat exchange relation with the second heat exchanger means.

20. A method for controlling the air temperature of a conditioned space to a predetermined set point temperature, comprising the steps of:

providing a supply of cryogen which includes cryogen in liquid and vapor states, providing first and second separate, independent cryogen flow paths for the liquid and vapor states of the cryogen, respectively, providing a cooling mode, said cooling mode including the steps of cooling the air of the conditioned space via first and second heat exchanger means respectively disposed in said first and second flow paths, and providing a defrosting mode for defrosting the first and second heat exchanger means, and defrosting mode including the steps of adding heat to both the liquid and vaporized states of the cryogen from the supply, vaporizing the liquid cryogen, maintaining the heated, vaporized cryogen from both the liquid and vaporized states in the first and second separate, independent flow paths,
and directing the heated cryogen in heat exchange relation with the first and second heat exchanger means via said first and second independent flow paths.

21. A method for controlling the air temperature of a conditioned space to a predetermined set point temperature, comprising the steps of:
providing a supply of cryogen which includes cryogen in liquid and vapor states,
providing first and second separate, independent cryogen flow paths for the liquid and vapor states of the cryogen, respectively,
providing a cooling-mode,
said cooling mode including the steps of cooling the air of the conditioned space via first and second heat exchanger means respectively disposed in said first and second flow paths,
providing a heating mode for the conditioned space,
and switching between the cooling and heating modes, as required to hold the predetermined set point temperature of the conditioned space,
said heating mode including the steps of adding heat to liquid cryogen from the supply, vaporizing the liquid cryogen, and directing the heated, vaporized cryogen in heat exchange relation with the first heat exchanger means.

22. A method for controlling the air temperature of a conditioned space to a predetermined set point temperature, comprising the steps of:
providing a supply of cryogen which includes cryogen in liquid and vapor states,
providing first and second separate, independent cryogen flow paths for the liquid and vapor states of the cryogen, respectively,
providing a cooling mode,
said cooling mode including the steps of cooling the air of the conditioned space via first and second heat exchanger means respectively disposed in said first and second flow paths,
providing a heating mode for the conditioned space,
and switching between the cooling and heating modes, as required to hold the predetermined set point temperature of the conditioned space,
said heating mode including the steps of adding heat to the vaporized cryogen from the supply, and directing the heated vaporized cryogen in heat exchange relation with the second heat exchanger means.

23. A method for controlling the air temperature of a conditioned space to a predetermined set point temperature, comprising the steps of:
providing a supply of cryogen which includes cryogen in liquid and vapor states,
providing first and second separate, independent cryogen flow paths for the liquid and vapor states of the cryogen, respectively,
providing a cooling mode,
said cooling mode including the steps of cooling the air of the conditioned space via first and second heat exchanger means respectively disposed in said first and second flow paths,
moving air from the conditioned space in heat exchange relation with at least the first heat exchanger means, said air moving step including the steps of providing a vapor driven motor and fan, and providing an independent fan control mode,
said independent fan control mode including the steps of altering the first independent flow path to by-pass the first heat exchanger means, adding heat to cryogen in the first flow path, and directing the heated, vaporized cryogen through the vapor driven motor.

24. The method of claim 23 wherein the step of adding heat to the first flow path adds the heat after the cryogen has performed all required heat exchange functions.

25. A method for controlling the air temperature of a conditioned space to a predetermined set point temperature, comprising the steps of:
providing a supply of cryogen which includes cryogen in liquid and vapor states,
providing first and second separate, independent cryogen flow paths for the liquid and vapor states of the cryogen, respectively,
providing a cooling mode,
said cooling mode including the steps of cooling the air of the conditioned space via first and second heat exchanger means respectively disposed in said first and second flow paths,
moving air from the conditioned space in heat exchange relation with at least the second heat exchanger means, said air moving step including the steps of providing a vapor driven motor and fan, and providing an independent fan control mode,
said independent fan control mode including the steps of altering the second independent flow path to by-pass the second heat exchanger means, adding heat to vaporized cryogen in the second flow path, and directing the heated, vaporized cryogen through the vapor driven motor.

26. The method of claim 25 wherein the step of adding heat to the second flow path adds the heat after the cryogen has performed all required heat exchange functions.

27. A method for conditioning the air of first and second conditioned spaces to selected set point temperatures, comprising the steps of:
providing a supply of cryogen which includes cryogen in liquid and vapor states,
providing first and second heat exchanger means,
providing first and second separate, independent cryogen flow paths for the liquid and vapor states of the supply, which respectively include the first and second heat exchanger means,
cooling the air of the first and second conditioned spaces, when required to achieve the associated set point temperature, via the first and second independent flow paths and first and second heat exchanger means,
and heating the air of the first and second conditioned spaces, when required to achieve set point temperature, via the first and second heat exchanger means, respectively,
said heating step including the steps of:
adding heat to liquid cryogen from the supply, vaporizing the liquid cryogen, to provide a first source of heated, vaporized cryogen,
adding heat to the vaporized cryogen from the supply, to provide a second source of heated, vaporized cryogen, maintaining the first and second sources of cryogen in said first and second separate, independent flow paths, and directing the first and second sources of cryogen in heat exchange relation with the first and second heat exchanger means via said first and second flow paths.

28. The method of claim 27 including the step of moving air from the first conditioned space in heat exchange relation with the first heat exchanger means, said air moving step including the steps of:

providing a vapor driven motor and fan, heating cryogen in the first flow path after the cryogen has performed all required heat exchange functions, and directing the heated cryogen through the vapor driven motor via the first flow path.

29. The method of claim 27 including the step of moving air from the second conditioned space in heat exchange relation with the second heat exchanger means, said air moving step including the steps of:

providing a vapor driven motor and fan, heating cryogen in the second flow path after the cryogen has performed all commanded cooling and heating functions, and directing the heated cryogen through the vapor driven motor via the second flow path.

30. The method of claim 27 including the step of heating the supply of cryogen to vaporize liquid cryogen and provide additional vaporized cryogen for use in the second independent flow path.

31. A method of using a cryogen to maintain a first and second predetermined set point temperatures in first and second conditioned spaces of a vehicle, comprising the steps of:

providing first and second vessels on the vehicle, filling said first vessel with a liquid cryogen which has a predetermined first pressure, transferring cryogen from the first vessel to the second vessel as a function of the requirements of the first and second conditioned spaces, with the cryogen in the second vessel being at a second pressure which is lower than the first pressure, resulting in the cryogen in the second vessel being in both liquid and vapor states, using the liquid cryogen in the second vessel to maintain the predetermined set point temperature of the first conditioned space, and using the vaporized cryogen in the second vessel to maintain the predetermined set point temperature of the second conditioned space.

32. The method of claim 31 wherein the cryogen is $CO_2$.

33. A refrigeration system for controlling the air temperature of a conditioned space to a selected set point temperature via a cooling mode, comprising:

a supply of cryogen which includes cryogen in liquid and vapor states, first and second heat exchanger means, first and second separate, independent cryogen flow paths, means directing liquid cryogen from the supply through the first heat exchanger means via the first flow path, vaporizing the liquid cryogen, means directing vaporized cryogen from the supply through the second heat exchanger means via the second flow path, vapor driven motor means, and fan means driven by the vapor driven motor means which moves air in the conditioned space in heat exchange relation with at least one of the first and second heat exchanger means, and means directing the vaporized cryogen in a selected one of the first and second flow paths through the vapor driven motor means to drive the motor and fan means.

34. The refrigeration system of claim 33 wherein the directing means directs the vaporized cryogen in the first flow path through the vapor driven motor means, and including a second vapor driven motor and fan means, and means directing the vaporized cryogen of the second flow path through the second vapor driven motor means.

35. The refrigeration system of claim 33 including regulating means for regulating the vapor pressure of vaporized cryogen above a predetermined value.

36. The refrigeration system of claim 33 wherein the directing means directs vaporized cryogen in the first flow path through the vapor driven motor means, and including expansion means in the first flow path, downstream from the first heat exchanger means, for expanding vaporized cryogen isenthalpically.

37. The refrigeration system of claim 33 wherein the directing means directs vaporized cryogen in the second flow path through the vapor driven motor means, and including expansion means in the second flow path, downstream from the first heat exchanger means, for expanding vaporized cryogen isenthalpically.

38. The refrigeration system of claim 33 wherein the directing means directs vaporized cryogen in the first flow path through the vapor driven motor means, and including additional heat exchanger means, and means directing vaporized cryogen in the first flow path through said additional heat exchanger means, with the vapor driven motor and fan means moving air from the conditioned space in heat exchange relation with the first heat exchanger means and said additional heat exchanger means.

39. The refrigeration system of claim 33 wherein the directing means directs vaporized cryogen in the second flow path through the vapor driven motor means, and including additional heat exchanger means, and means directing vaporized cryogen in the second flow path through said additional heat exchanger means, with the vapor driven motor and fan means moving air in the conditioned space in heat exchange relation with the second heat exchanger means and said additional heat exchanger means.

40. The refrigeration system of claim 38 wherein the additional heat exchanger means is disposed such that the directing means directs vaporized cryogen in the first flow path through the additional heat exchanger means upstream from the means for directing vaporized cryogen in the first flow path through the vapor driven motor means.

41. The refrigeration system of claim 39 wherein the additional heat exchanger means is disposed such that the directing means directs vaporized cryogen in the second flow path through the additional heat exchanger means, upstream from the means for directing vaporized cryogen in the second flow path through the vapor driven motor means.

42. The refrigeration system of claim 38 wherein the additional heat exchanger means is disposed such that the directing means directs vaporized cryogen in the first flow path through the additional heat exchanger means downstream from the means for directing vaporized cryogen in the first flow path through the vapor driven motor means, whereby the vapor driven motor means is between the first and additional heat exchanger means.

43. The refrigeration system of claim 39 wherein the additional heat exchanger means is disposed such that the directing means directs vaporized cryogen in the second flow path through the additional heat exchanger means downstream from the means for directing vaporized cryogen in the second flow path through the vapor driven motor means, whereby the vapor driven motor means is between the second and additional heat exchanger means.

44. The refrigeration system of claim 33 wherein the conditioned space is divided into first and second conditioned spaces, with the first and second heat exchangers being respectively associated with said first and second conditioned spaces, and wherein the vapor driven motor means is in the first flow path such that the fan means moves air from the first conditioned space in heat exchange relation with the first heat exchanger means, and including second vapor driven motor means and associated fan means, with the second motor means being in the second flow path, driving the second motor means to move air from the second conditioned space in heat exchange relation with the second heat exchanger means.

45. The refrigeration system of claim 33 including first and second vessels, with the supply of cryogen being in the second vessel,
liquid cryogen in the first vessel,
and expansion means providing the supply of cryogen in the second vessel by expanding liquid cryogen from the first vessel into the second vessel.

46. The refrigeration system of claim 45 wherein the cryogen is $CO_2$.

47. The refrigeration system of claim 33 including defrost means for providing a defrost mode which defrosts the first heat exchanger means, and wherein the defrost means includes means disposed upstream from the first heat exchanger means for adding heat to cryogen in the first flow path, and means preventing heat exchange between the first heat exchanger means and air from the conditioned space during said defrost mode.

48. The refrigeration system of claim 33 including defrost means for providing a defrost mode which defrosts the second heat exchanger means, and wherein the defrost means includes means disposed upstream from the second heat exchanger means for adding heat to cryogen in the second flow path, and means preventing heat exchange between the second heat exchanger means and air from the conditioned space during said defrost mode.

49. The refrigeration system of claim 33 including heat means for providing a heating mode in addition to the cooling mode for holding the predetermined set point temperature in the conditioned space, and wherein the heat means includes means associated with the first flow path disposed upstream from the first heat exchanger means for adding heat to the liquid cryogen from the supply.

50. The refrigeration system of claim 33 including heat means for providing a heating mode in addition to the cooling mode for holding the predetermined set point temperature in the conditioned space, and wherein the heat means includes means associated with the second flow path disposed upstream from the second heat exchanger means for adding heat to the vaporized cryogen from the supply.

51. The refrigeration system of claim 33 including independent fan control means for operating the vapor driven motor means and fan means,
said independent fan control means including means associated with the first flow path for adding heat to the liquid cryogen from the supply,
and means for directing the heated cryogen through the vapor driven motor while by-passing the first heat exchanger means.

52. The refrigeration system of claim 33 including independent fan control means for operating the vapor driven motor means and fan means,
said independent fan control means including means associated with the second flow path for adding heat to the vaporized cryogen,
and means for directing the heated cryogen through the vapor driven motor while by-passing the second heat exchanger means.

53. The refrigeration system of claim 33 including means for heating the supply of cryogen to vaporize liquid cryogen and provide additional cryogen in the vapor state for use in the second flow path.

54. A refrigeration system for conditioning the air of first and second conditioned spaces to selected set point temperatures via cooling and heating modes, comprising:
a supply of cryogen which includes cryogen in liquid and vapor states,
first and second heat exchanger means,
first and second separate, independent flow paths for the liquid and vaporized states of the supply which respectively include the first and second heat exchanger means, with the liquid and vaporized cryogen cooling the first and second conditioned spaces during a cooling mode,
means for adding heat to liquid cryogen from the supply when a heating mode is required, to vaporize the liquid cryogen and provide a first source of heated cryogen,
means for adding heat to vaporized cryogen from the supply when a heating mode is required, to provide a second source of heated cryogen,
means for maintaining the first and second sources of heated cryogen in said first and second separate, independent flow paths,
and means for directing the first and second sources of heated cryogen in heat exchange relation with the first and second heat exchanger means via the first and second flow paths when a heating mode is required.

55. The refrigeration system of claim 54 including a vapor driven motor and fan disposed to move air from the first conditioned space in heat exchange relation with the first heat exchanger means, with the first flow path directing cryogen through the vapor driven motor.

56. The refrigeration system of claim 54 including a vapor driven motor and fan disposed to move air from the second conditioned space in heat exchange relation with the second heat exchanger means, with the second flow path directing cryogen through the vapor driven motor.

57. The refrigeration system of claim 55 including an additional heat exchanger means in the first flow path, downstream from the first heat exchanger, and wherein the vapor driven motor is disposed downstream from said additional heat exchanger means.

58. The refrigeration system of claim 56 including an additional heat exchanger means in the second flow path, downstream from the second heat exchanger means, and wherein the vapor driven motor is disposed downstream from said additional heat exchanger means.

59. A refrigeration system which uses a cryogen to maintain first and second predetermined set point temperatures in first and second conditioned spaces of a vehicle, comprising:

first and second vessels on the vehicle, said first vessel being initially substantially filled with a liquid cryogen, control means between the first and second vessels which admits cryogen into the second vessel from the first vessel as a function of the requirements of the conditioned space, with the cryogen in the second vessel being at a lower pressure than in the first vessel, providing the cryogen in both the liquid and vapor states in the second vessel, means using the liquid cryogen in the second vessel to maintain the selected set point temperature of the first conditioned space, and means using the vaporized cryogen in the second vessel to maintain the selected set point temperature of the second conditioned space.

60. The refrigeration system of claim 59 wherein the cryogen is $CO_2$.

* * * * *